(12) United States Patent
Muramatsu et al.

(10) Patent No.: US 11,640,428 B2
(45) Date of Patent: May 2, 2023

(54) COLLATION DEVICE, COLLATION METHOD, AND COLLATION PROGRAM

(71) Applicant: NIPPON TELEGRAPH AND TELEPHONE CORPORATION, Tokyo (JP)

(72) Inventors: Sanae Muramatsu, Tokyo (JP); Takeharu Eda, Tokyo (JP); Keita Mikami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 31 days.

(21) Appl. No.: 17/271,561

(22) PCT Filed: Aug. 23, 2019

(86) PCT No.: PCT/JP2019/033188
§ 371 (c)(1),
(2) Date: Feb. 25, 2021

(87) PCT Pub. No.: WO2020/045314
PCT Pub. Date: Mar. 5, 2020

(65) Prior Publication Data
US 2021/0326384 A1 Oct. 21, 2021

(30) Foreign Application Priority Data
Aug. 27, 2018 (JP) .............................. JP2018-158513

(51) Int. Cl.
*G06F 16/901* (2019.01)
*G06F 16/9032* (2019.01)

(52) U.S. Cl.
CPC ........ *G06F 16/901* (2019.01); *G06F 16/9032* (2019.01)

(58) Field of Classification Search
CPC .... G06F 16/901; G06F 16/9032; G06F 16/51; G06F 16/583; G06F 16/532; G06N 3/02; G06N 3/0427
See application file for complete search history.

(56) References Cited

U.S. PATENT DOCUMENTS

| | | | |
|---|---|---|---|
| 6,751,363 B1 * | 6/2004 | Natsev | G06V 10/431 |
| | | | 382/209 |
| 10,410,095 B2 * | 9/2019 | Li | G06K 9/6215 |
| 2015/0356063 A1 * | 12/2015 | Jiang | H04L 2101/69 |
| | | | 715/232 |
| 2018/0181847 A1 * | 6/2018 | Ogaki | G06K 15/403 |
| 2019/0138641 A1 * | 5/2019 | Pal | G06F 16/27 |

OTHER PUBLICATIONS

Ahmed et al. (2015) "An Improved Deep Learning Architecture for Person Re-Identification," in 2015 IEEE Conference on Computer Vision and Pattern Recognition (CVPR), Boston, MA, USA, 2015 pp. 3908-3916.

* cited by examiner

*Primary Examiner* — Cam Y T Truong (57) ABSTRACT

An index generation unit (15a) generates an index in which a plurality of combinations of query data that is a collation source and target data that is a collation destination are listed in a predetermined order. A batch generation unit (15b) uses a plurality of combinations of query data and target data in an order according to the index to generate a batch with a predetermined volume. A collation unit (16) calculates a degree of similarity between the query data and the target data for each combination included in the batch, in which processes are parallelized and performed.

20 Claims, 12 Drawing Sheets

(1) INDEX GENERATION

| query | target |
|---|---|
| 1 | 1 |
| 1 | 2 |
| 1 | 3 |
| 1 | 4 |
| 1 | 5 |
| 2 | 1 |
| 2 | 2 |
| 2 | 3 |
| 2 | 4 |
| 2 | 5 |
| 3 | 1 |
| 3 | 2 |
| 3 | 3 |
| 3 | 4 |
| 3 | 5 | cal_index (2) BATCH GENERATION

| query | target |
|---|---|
| 1 | 1 |
| 1 | 2 |
| 1 | 3 |
| 1 | 4 |
| 1 | 5 |
| 2 | 1 |
| 2 | 2 |
| 2 | 3 |
| 2 | 4 |
| 2 | 5 |

⎫ 10

| query | target |
|---|---|
| 3 | 1 |
| 3 | 2 |
| 3 | 3 |
| 3 | 4 |
| 3 | 5 | make_batch

Fig. 6

(a) RELATED-ART APPROACH

```
query = [q1, q2, q3, ···]
target = [t1, t2, t3, ···]
f_query = get_feature(query)
f_target = get_feature(target)
for (i = 0, i < |query| ){
        result += compare(f_query[i], t_target)
}
```

(b) PRESENT INVENTION

```
query = [q1, q2, q3, ···]
target = [t1, t2, t3, ···]
f_query = get_feature(query)
f_target = get_feature(target)
index = cal_index(N, M)
while (|index| <= 0 ){
        b_query, b_target =
              make_batch(index, batch_size)
        index = index[batch_size:]
        result += compare(b_query, b_target)
}
```

(a) PRINCIPLE

| query | target |
|---|---|
| 1 | 1 |
| 1 | 2 |
| 1 | 3 |
| 1 | 4 |
| 1 | 5 |

| query | target |
|---|---|
| 1 | 6 |
| 1 | 7 |
| 1 | 8 |
| 1 | 9 |
| 1 | 10 |

| query | target |
|---|---|
| 1 | 11 |
| 1 | 12 |
| 1 | 13 |
| 1 | 14 |
| 1 | 15 |

| query | target |
|---|---|
| 1 | 16 |
| 1 | 17 |
| 1 | 18 |
| 1 | 19 |
| 1 | 20 |

⋮

(b) REARRANGE INDEX

| query | target |
|---|---|
| 1 | 1 |
| 2 | 1 |
| 1 | 2 |
| 2 | 2 |
| 1 | 3 |

| query | target |
|---|---|
| 2 | 3 |
| 1 | 4 |
| 2 | 4 |
| 1 | 5 |
| 2 | 5 |

| query | target |
|---|---|
| 1 | 6 |
| 2 | 6 |
| 1 | 7 |
| 2 | 7 |
| 1 | 8 |

| query | target |
|---|---|
| 2 | 8 |
| 1 | 9 |
| 2 | 9 |
| 1 | 10 |
| 2 | 10 |

COLLATION DEVICE, COLLATION METHOD, AND COLLATION PROGRAM

CROSS-REFERENCE TO RELATED APPLICATIONS

This application is a U.S. 371 Application of International Patent Application No. PCT/JP2019/033188, filed on 23 Aug. 2019, which application claims priority to and the benefit of JP Application No. 2018-158513, filed on 27 Aug. 2018, the disclosures of which are hereby incorporated herein by reference in their entireties.

TECHNICAL FIELD

The present invention relates to a collation apparatus, a collation method, and a collation program.

BACKGROUND ART

Deep Learning is used for some of recent collation tasks of calculating a degree of similarity between two pieces of same-typed data such as images and sounds. For example, a neural network is used for calculating a degree of similarity between two images to perform re-collation (see Non Patent Literature 1).

Generally, Deep Learning is implemented with a matrix operation using a Graphics Processing Unit (GPU). The GPU is a processor designed for achieving high-speed processing for matrix operations for a large amount of coordinate transformations in three-dimensional graphics and the like, and can perform simple calculation processes independent from each other in parallel.

For example, in a collation task between a query image (an image of a person to be searched) and a target image (an image of a person in an image captured by a surveillance camera or the like), the GPU is used for calculating the degree of similarity between each query image and a plurality of target images.

CITATION LIST

Non Patent Literature

Non Patent Literature 1: Ejaz Ahmed, et al., "An Improved Deep Learning Architecture for Person Re-Identification," CVPR2015, IEEE Xplore, 2015, pp. 3908 to 3916

SUMMARY OF THE INVENTION

Technical Problem

Unfortunately, related-art techniques involve a huge increase in processing time when a plurality of collation tasks are performed. More specifically, a plurality of pieces of query data means that the processing time in GPU is multiplied by the number of the pieces of query data. For example, in a case of performing collation for a plurality of persons at once or a case of performing collation in an ensemble using a plurality of query images of a single person, the processing time is multiplied by the number of query images.

The present invention is made in view of the foregoing, and an object thereof is to efficiently perform a plurality of collation tasks.

Means for Solving the Problem

In order to resolve the problems described above and achieve the object, a collation apparatus according to the present invention includes: an index generation unit configured to generate an index in which a plurality of combinations of query data that is a collation source and target data that is a collation destination are listed in a predetermined order; a batch generation unit configured to use the plurality of combinations in an order according to the index to generate a batch with a predetermined volume; and a collation unit configured to calculate a degree of similarity between the query data and the target data in included the combinations in the batch.

Effects of the Invention

With the present invention, a plurality of collation tasks can be performed efficiently.

DESCRIPTION OF EMBODIMENTS

Hereinafter, embodiments of the present invention will be described in detail with reference to the drawings. Note that the present disclosure is not limited by the embodiments. In the description of the drawings, the identical parts are denoted by the identical reference signs.

Overview of Collation Task

Figure 1:
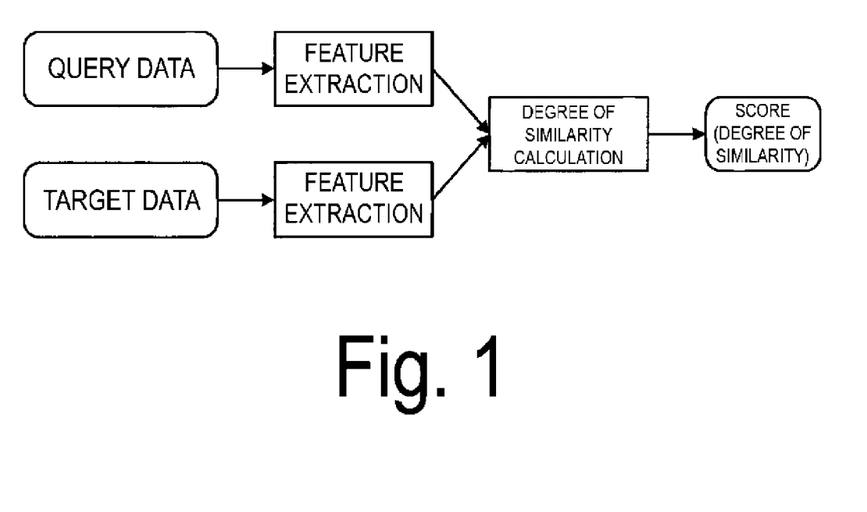
FIG. 1 is a diagram illustrating an overview of a collation task.
Figure 2:
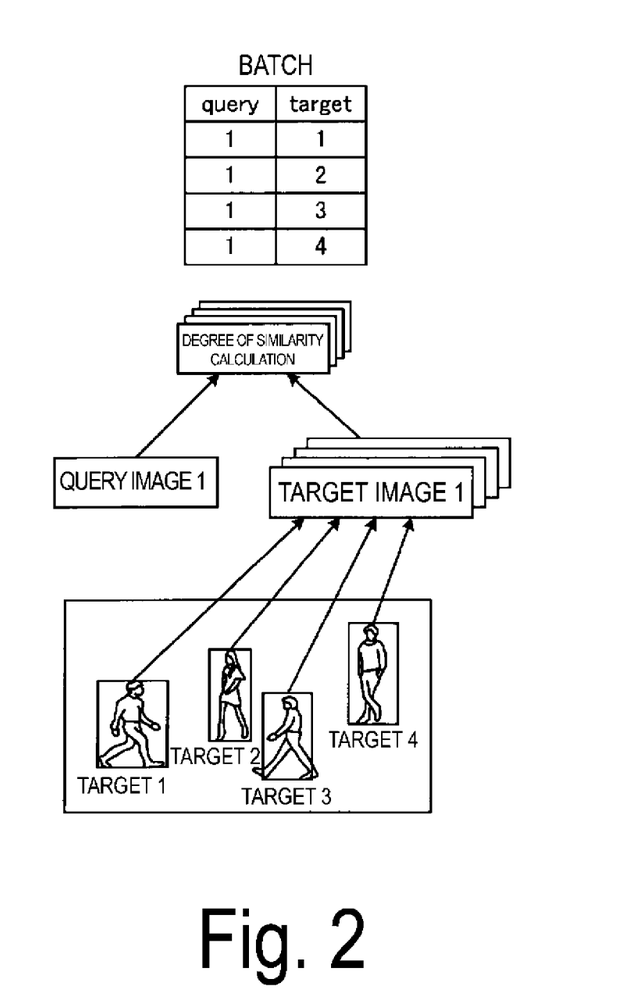
FIG. 2 is a diagram illustrating an overview of the collation task.
Figure 3:
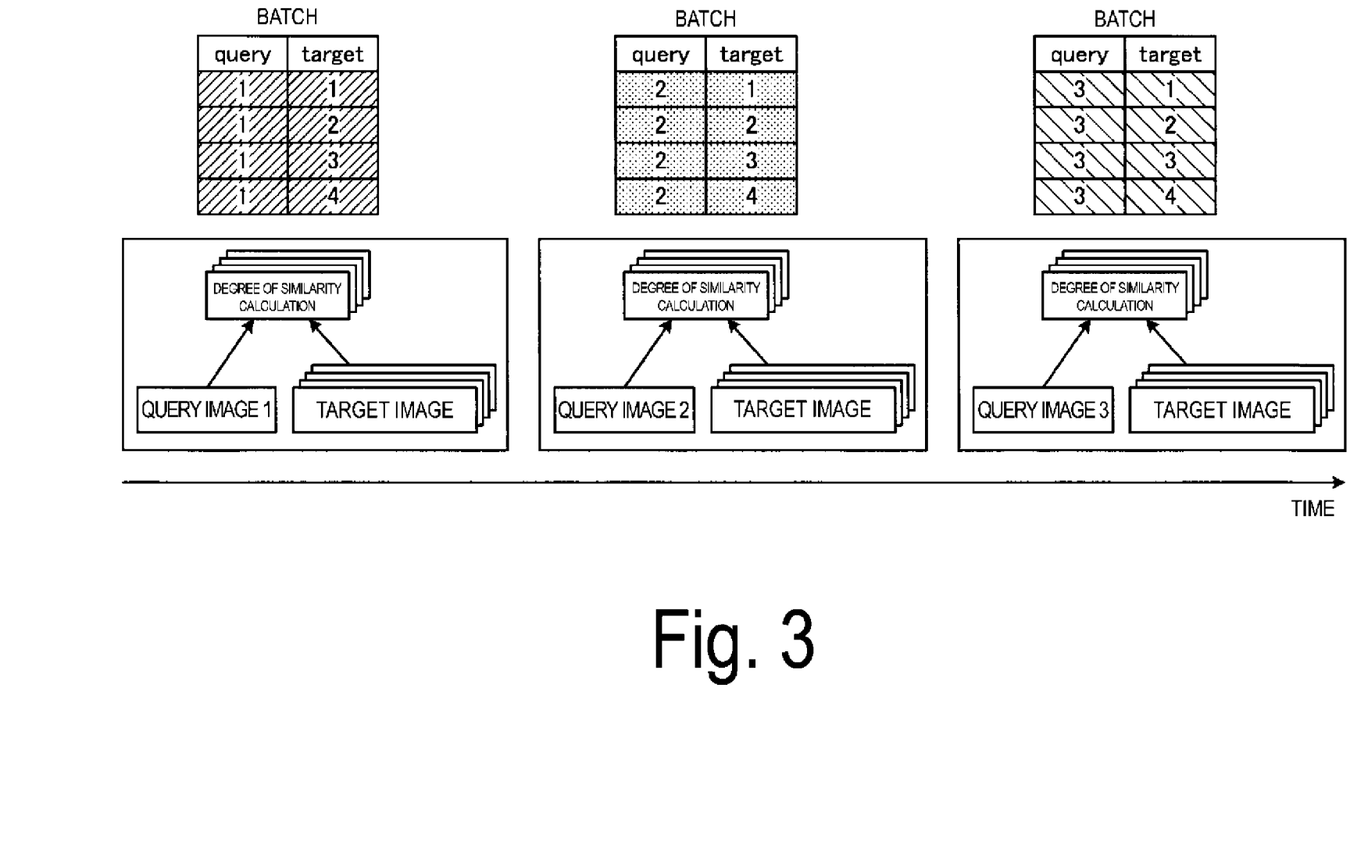
FIG. 3 is a diagram illustrating an overview of the collation task.

FIGS. 1 to 3 are diagrams illustrating an overview of a collation task. First of all, as illustrated in FIG. 1, a collation task that is the target of processing by a collation apparatus according to the present embodiment includes two calculation processes that are feature extraction and degree of similarity calculation. For each of the feature extraction and the degree of similarity calculation, a calculation process using Deep Learning using a neural network is individually performed. More specifically, a matrix operation using a GPU is performed on each of the feature extraction and the degree of similarity calculation.

For example, in a collation task of calculating a degree of similarity between two input images that are a query image (collation source) and a target image (collation destination) when the two images are input, feature of each of the query image and the target image is extracted with the feature extraction. A score indicating the degree of similarity between the query image and the target image is calculated with the degree of similarity calculation (see Non Patent Literature 1).

In this context, as illustrated in FIG. 2, the degree of similarity calculations for a plurality of target images with respect to a single query image can be parallelized and performed simultaneously, when the images are batched to be input to the GPU. In the example illustrated in FIG. 2, four degree of similarity calculations between one query image of one person and four target images of four persons can be parallelized as a single matrix operation in the GPU.

On the other hand, when there are a plurality of query images, the processing illustrated in FIG. 2 is repeated for the number of query images, as illustrated in FIG. 3. FIG. 3 illustrates an example of a case where degrees of similarity with target images of four persons are calculated for each of query images of three persons. In this case, the "matrix operation for calculating degrees of similarity between a query image of one person and the target images of four persons" is repeated three times.

Thus, for example, in a case of collating a plurality of persons (collation source) at once or a case of collating in an ensemble using a plurality of query images for a single person, the processing time in the GPU is multiplied by the number of query images.

Figure 4:
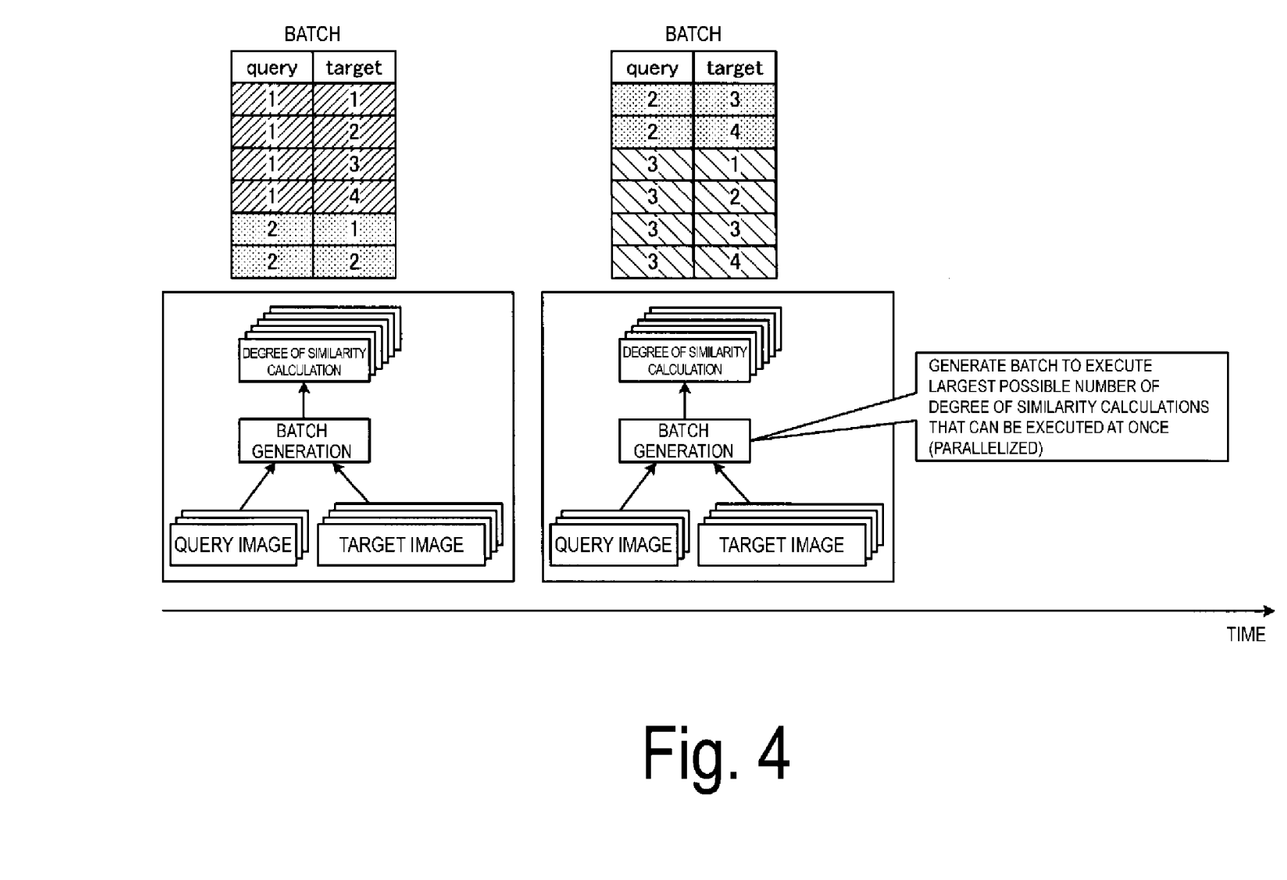
FIG. 4 is a diagram illustrating an overview of a collation apparatus.

FIG. 4 is a diagram illustrating an overview of a collation apparatus to address this. The collation apparatus of the present embodiment, by collation process described later, as illustrated in FIG. 4, generates a batch with the largest possible size that can be processed at once, without limiting the batch size to each query image. Thus, the collation apparatus of the present embodiment efficiently calculates degrees of similarity for a plurality of query images.

Note that the feature extraction is performed before the degree of similarity calculation. Furthermore, the collation task that is the target of the processing by the collation apparatus does not necessarily need to include the feature extraction. In other words, the feature of the query image and the target image does not necessarily need to be used for calculating a degree of similarity.

Furthermore, a neural network does not necessarily need to be used for one or both of the feature extraction and the degree of similarity calculation of the collation task that is the processing target. It suffices if the collation task that is the target of processing by the collation apparatus includes a matrix operation using the GPU for degree of similarity calculation.

Thus, the collation task that is the target of collation process described later means a matrix operation for calculating a degree of similarity using the GPU. Data that is the target of the processing in the collation task is not limited to an image, and may be, for example, sound. Thus, the query image and the target image described above are respectively query data and target data in a case where the data is an image.

Configuration of Collation Apparatus

Figure 5:
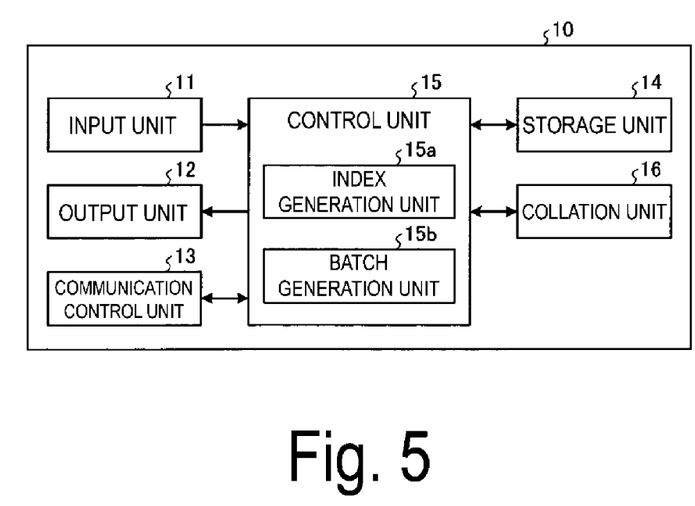
FIG. 5 is a schematic view illustrating an example of a schematic configuration of the collation apparatus.

FIG. 5 is a schematic view illustrating an example of a schematic configuration of a collation apparatus. As illustrated as an example in FIG. 5, a collation apparatus 10 is implemented by a general-purpose computer such as a personal computer and includes an input unit 11, an output unit 12, a communication control unit 13, a storage unit 14, a control unit 15, and a collation unit 16.

The input unit 11 is implemented by using an input device such as a keyboard and a mouse, and inputs various kinds of command information for starting processing to the control unit 15 in response to an input operation of an operator. The output unit 12 is implemented by a display apparatus such as a liquid crystal display or a print apparatus such as a printer.

The communication control unit 13 is implemented by a network interface card (NIC) or the like and controls communication between the control unit 15 and an external apparatus via an electric communication line such as a local area network (LAN) or the Internet.

The storage unit 14 is implemented by a Random Access Memory (RAM), a semiconductor memory element such as a Flash Memory, or a storage apparatus such as a hard disk and an optical disc, and stores a batch generated by collation process described later. Note that the storage unit 14 may be configured to communicate with the control unit 15 via the communication control unit 13.

The collation unit 16 is implemented using a GPU, and calculates a degree of similarity between the query data and the target data of a combination included in the batch. More specifically, based on a batch generated by the control unit 15 through collation process described later, the collation unit 16 performs collation between the query image and the target image of a combination included in the batch, and parallelizes and performs collation tasks of calculating the degree of similarity therebetween for each of a plurality of the combinations. Note that a configuration may be employed in which the collation unit 16 is implemented on hardware different from that with the control unit 15, and communicates with the control unit 15 via the communication control unit 13.

The control unit 15 is implemented by using a Central Processing Unit (CPU), and executes a processing program stored in a memory. Accordingly, the control unit 15 functions as an index generation unit 15a and a batch generation unit 15b as illustrated in FIG. 5 as an example. Note that these functional units may be installed on different pieces of hardware.

The index generation unit 15a generates an index in which a plurality of combinations of the query data (collation source) and the target data (collation destination) are listed in a predetermined order. More specifically, the index generation unit 15a combines the plurality of pieces of query data and the plurality of pieces of target data in the collation task one by one, and lists the resultant combinations to generate the index. For example, the index generation unit 15a generates a list of combinations with different target data pieces combined with each pieces of query data in order of sequence.

The batch generation unit 15b uses a plurality of combinations of query data and target data in the order according to the index to generate a batch with a predetermined volume. Specifically, the batch generation unit 15b batches the combinations of query data and target data in the order according to the index until reaching the largest possible batch size processable by the GPU at once, to generate a batch.

The batch size is a value set in accordance with the memory capacity of the GPU. Thus, the GPU executes a larger matrix operation, so that multiple collation (degree of similarity calculation) processes can be parallelized and efficiently executed.

The batch generation unit 15b transfers the generated batch to the collation unit 16. The large matrix operation as described above leads to a reasonable amount of batches transferred to the GPU, resulting in a lower transfer cost.

Figure 6:
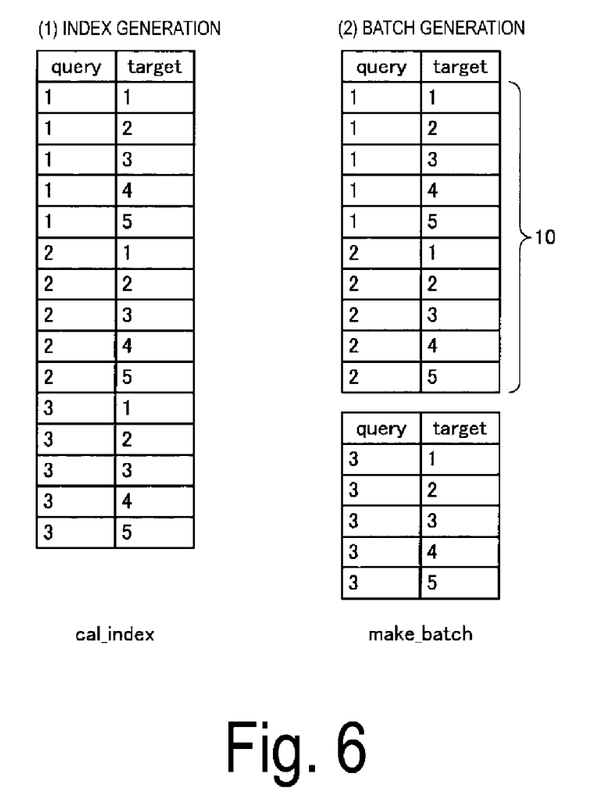
FIG. 6 is a diagram illustrating processing executed by the collation apparatus.
Figure 7:
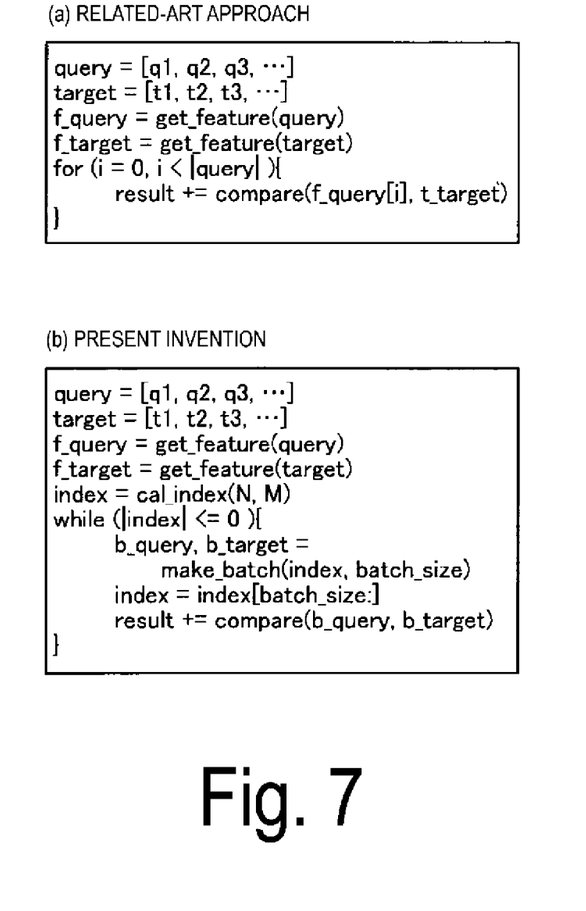
FIG. 7 is a diagram illustrating processing executed by the collation apparatus.
Figure 8:
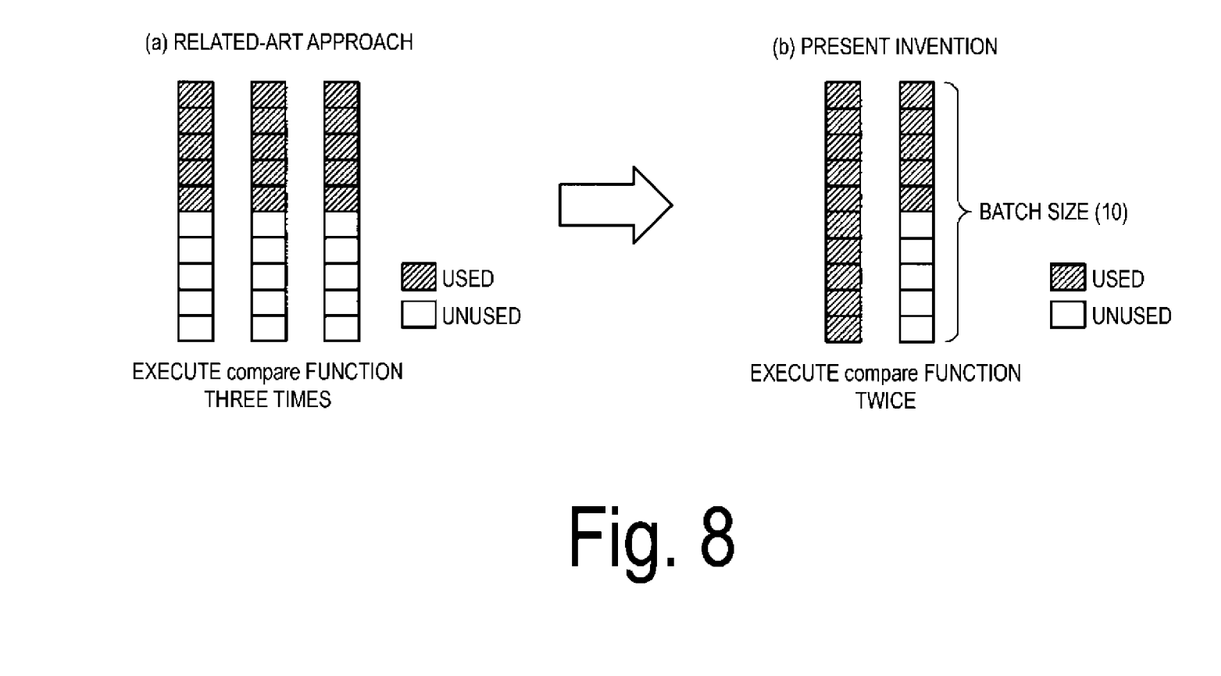
FIG. 8 is a diagram illustrating processing executed by the collation apparatus.

Now, FIGS. 6 to 8 are diagrams illustrating processing executed by the collation apparatus 10. First of all, as illustrated in FIG. 6(1), the index generation unit 15a combines the query images and the target images to generate an index (cal_index). In the example illustrated in FIG. 6, there are query images of three persons (|query|=3) and target images of five persons (|target|=5). All the combinations are listed with each of the query images combined with each of the target images.

Additionally, as illustrated in FIG. 6(2), the batch generation unit 15b batches the combinations of the query data and the target data in the order according to the index until the batch size is reached (make_batch). In the example illustrated in FIG. 6, the batch size is 10, and 10 combinations (illustrated in FIG. 6(1)) are batched in the order according to the index to generate the batch with the batch size 10.

In the related-art, as illustrated in FIG. 3, the GPU (collation unit 16) has executed the collation task using the batch obtained by combining a plurality of target images with each query image. FIG. 7(a) illustrates an example of a code representing this processing.

Thus, in the related-art, as illustrated in FIG. 8(a), the number of batches transferred to the GPU has been the identical as the number of query images, with each of the batches not fully occupied up to the batch size. The example illustrated in FIG. 8 is under a condition similar to that in FIG. 6. Specifically, there are query images of three persons, target images of five persons. Under this condition, a batch for each query image not fully occupied up to the batch size 10 (five unused) has been transferred to the GPU three times. This means that the collation task in the GPU requires the processing time that is three times as long as that in a case of a query image of a single person.

In contrast, FIG. 7(b) illustrates an example of a code representing the processing using the batch illustrated in FIG. 6(2) for example. In this case, as illustrated in FIG. 8(b), transferring batches occurs twice to transfer a batch fully occupied up to the batch size 10 and a batch including remaining combinations according to the index to the collation unit 16. Thus, parallelization of the collation tasks in the collation unit 16 is facilitated, so that the overall processing time can be reduced, whereby efficiency of the processing by the GPU can be increased.

Figure 9:
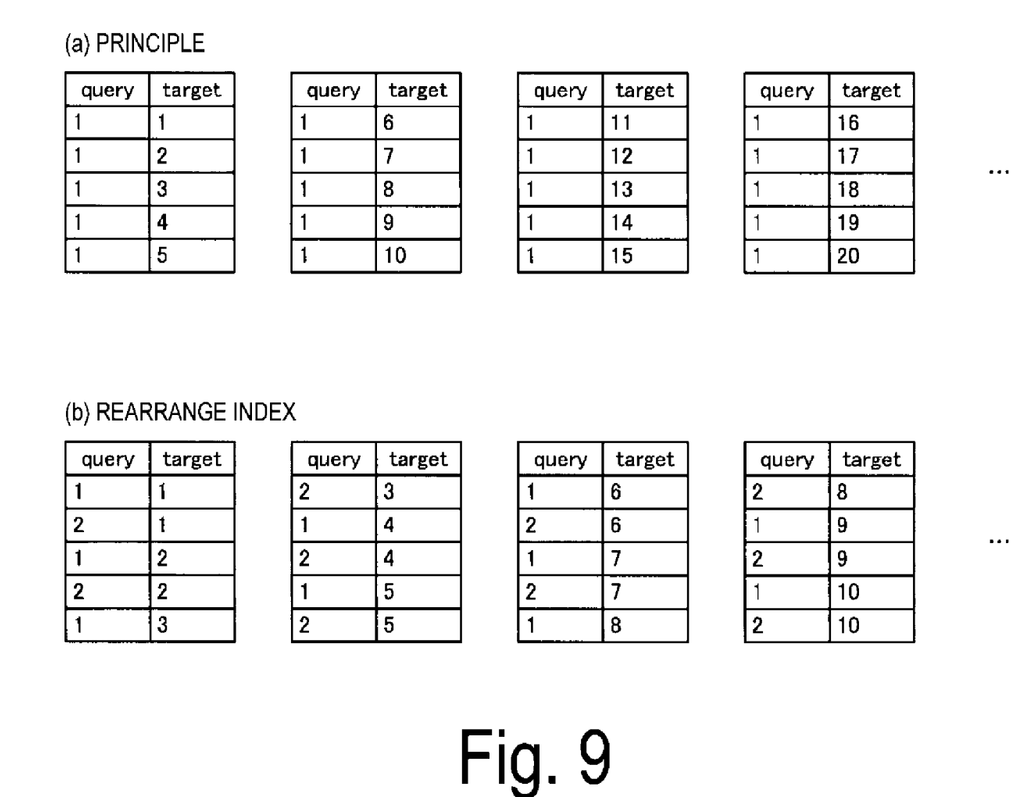
FIG. 9 is a diagram illustrating processing executed by an index generation unit.

The index generation unit 15a makes a list of combinations of query images and target images, in the order of the sequence of the target images. FIG. 9 is a diagram illustrating processing executed by the index generation unit 15a. In the example illustrated in FIG. 9, there are query images of two persons and target images of 20 persons, and the batch size is five.

In principle, the index generation unit 15a generates a list of combinations with each of the different target images combined with each of the query images. Specifically, combinations of query images and target images are listed in order of the sequence of the query images. Then, as illustrated in FIG. 9(a), the batch generation unit 15b batches the combinations of the query images and the target images in the order of the sequence of the query images listed by the index generation unit 15a.

In this case, the collation unit 16 needs to hold data such as the feature of a target image 1 (target=1) after being collated with a query image 1 (query=1), until the collation with a query image 2 (query=2) is completed, for example. In the example illustrated in FIG. 9(a), the data of the query image 2 needs to be held at least until the collation (degree of similarity calculation) processes in the number that is the identical as the number of target images are completed. This requires a large amount of memory of the GPU to be used.

In view of this, the index generation unit 15a rearranges the combinations in the index to be in the order of the sequence of the target images to generate an index. As a result, a batch as illustrated in FIG. 9(b) is generated. In the example illustrated in FIG. 9(b), the collation between the target image 1 and the query image 1 and the collation between the target image 1 and the query image 2 are performed in sequence. Thus, the period during which the data of the target image 1 needs to be held is shorter than that in the case illustrated in FIG. 9(a). Thus, the use of the memory of the GPU can be effectively reduced in a case where the number of target images is larger than that of the query images.

When the number of query images is larger than that of the target images, the index generation unit 15a may list the combinations of the query images and the target images in the order of the sequence of the query images based on the principle described above. Thus, the use of the memory of the GPU can be effectively reduced also in this case.

As described above, the GPU memory can be saved by changing the order of the list in the index to the order based on the number of pieces of query data (collation source), the number of pieces of target data (collation destination), and the batch size.

Collation Process

Figure 10:
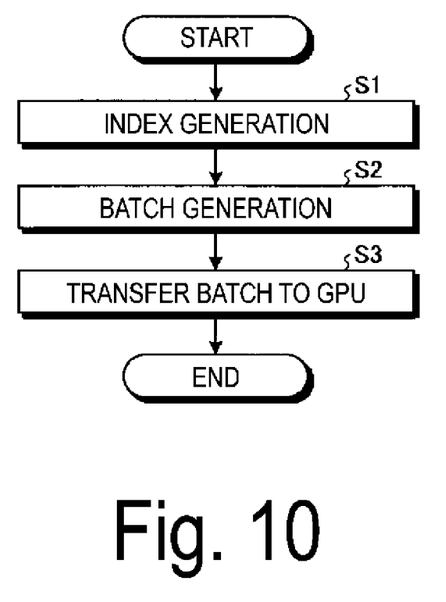
FIG. 10 is a flowchart illustrating a procedure of the collation process.

Next, the collation process executed by the collation apparatus 10 according to the present embodiment will be described with reference to FIG. 10. FIG. 5 is a flowchart illustrating a procedure of the collation process. For example, the flowchart illustrated in FIG. 10 starts at a timing when a user inputs an operation for instructing the start of the collation process.

First of all, the index generation unit 15a generates an index listing a plurality of combinations of query data and target data in a predetermined order. More specifically, the index generation unit 15a combines the plurality of query images and the plurality of target images in the collation task one to one, and lists the resultant combinations to generate the index (step S1).

Next, the batch generation unit 15b batches a plurality of combinations of query data and target data in the order according to the index until the batch size is reached, to generate a batch (step S2). In this process, the index generation unit 15a lists combinations of query images and target images, in the order of the sequence of the target images.

The batch generation unit 15b transfers the generated batch to the collation unit 16 implemented with the GPU (step S3). The collation unit 16 calculates a degree of similarity between the query data and the target data for each combination included in the batch. More specifically, based on a batch generated by the batch generation unit 15b, the collation unit 16 performs collation between the query image and the target image of a combination included in the batch, and parallelizes and executes a plurality of collation tasks of calculating the degree of similarity therebetween in parallel. This ends the series of collation processes.

As described above, in the collation apparatus 10 according to the present embodiment, the index generation unit 15*a* generates an index in which a plurality of combinations of the query data (collation source) and the target data (collation destination) are listed in a predetermined order. The batch generation unit 15*b* uses a plurality of combinations of query data and target data in the order according to the index to generate a batch with a predetermined volume. The collation unit 16 calculates a degree of similarity between the query data and the target data for each combination included in the batch.

Thus, the collation unit 16 executes a larger matrix operation, so that a large number of degree of similarity calculation processes can be parallelized. As a result, the processing time for the collation task in the collation unit 16 is reduced. For example, in a case of performing collation for a plurality of persons at once or a case of performing collation in an ensemble using a plurality of query images of a single person, a plurality of collation tasks can be efficiently performed. Furthermore, a reasonable number of batches are transferred to the collation unit 16, whereby the transfer cost can be suppressed.

The index generation unit 15*a* makes a list of combinations of query images and target images, in the order of the sequence of the target images. Thus, the use of the memory of the GPU can be effectively reduced in a case where the number of query images is larger than that of the target images.

EXAMPLES

Figure 11:
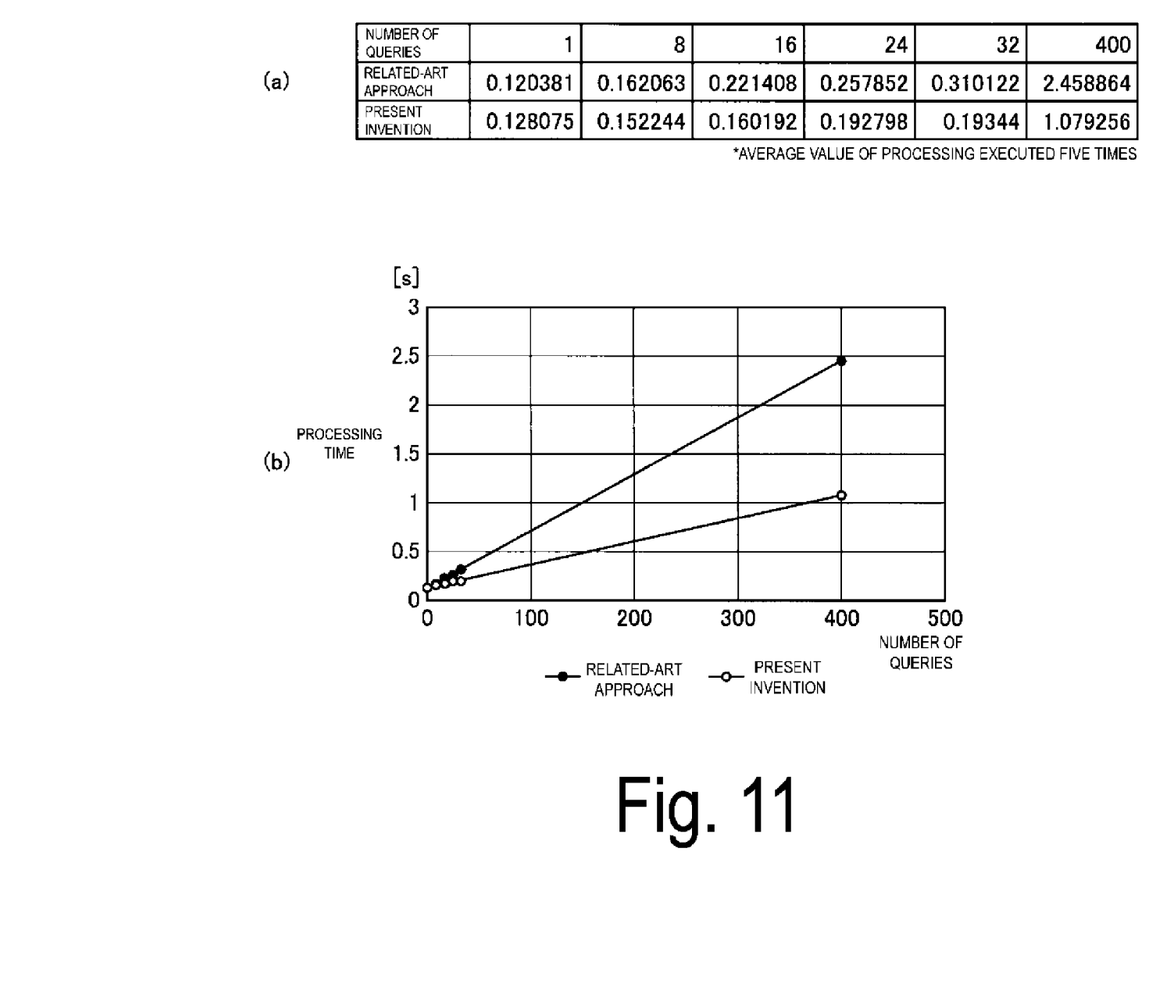
FIG. 11 is a diagram illustrating an example of collation process.

FIG. 11 is a diagram illustrating an example of the collation process. FIG. 11 illustrates the relationship between the number of query images (number of queries) and processing time, under a condition that the batch size is 32 and there are target images of 10 persons.

In the example illustrated in FIG. 11, as the number of queries for one person, the number of times the process to calculate the degree of similarity with the target image is 10 times, and the number of batches according to the present invention is 1. When the number of queries is 8, the number of times the process is executed is 80 times, and the number of batches according to the present invention is 3. When the number of queries is 16, the number of times the process is executed is 160 times, and the number of batches according to the present invention is 5. When the number of queries is 24, the number of times the process is executed is 240 times, and the number of batches according to the present invention is 8. When the number of queries is 32, the number of times the process is executed is 320 times, and the number of batches according to the present invention is 10.

In addition, FIG. 11(*a*) illustrates average values of the processing time in the case of the related-art approach (see FIG. 3) and in the case of the present invention, under a condition that the collation task is performed five times for each of the number of queries. FIG. 11(*b*) is a graph of values in FIG. 11(*a*). As can be seen in FIG. 11(*b*), with the collation process according to the present invention, the processing speed can be increased by approximately 1.5 times from that in the related-art, when the number of queries is 400. It can be seen that the efficiency of a plurality of collation tasks increases with the number of queries.

Program

It is also possible to create a program in which processing executed by the collation apparatus 10 according to the embodiment described above is described in a computer-executable language. As one embodiment, the collation apparatus 10 can be implemented by installing a collation program for executing the collation process as packaged software or on-line software on a desired computer. For example, an information processing apparatus executes the collation program, and thus, the information processing apparatus can function as the collation apparatus 10. The information processing apparatus described here includes a desktop or laptop personal computer. In addition, a mobile communication terminal such as a smartphone, a mobile phone, or a personal handyphone system (PHS), further a slate apparatus such as a personal digital assistant (PDA), and the like are also included in the scope of the information processing apparatus. In addition, the functions of the collation apparatus 10 may be mounted in a cloud server.

Figure 12:
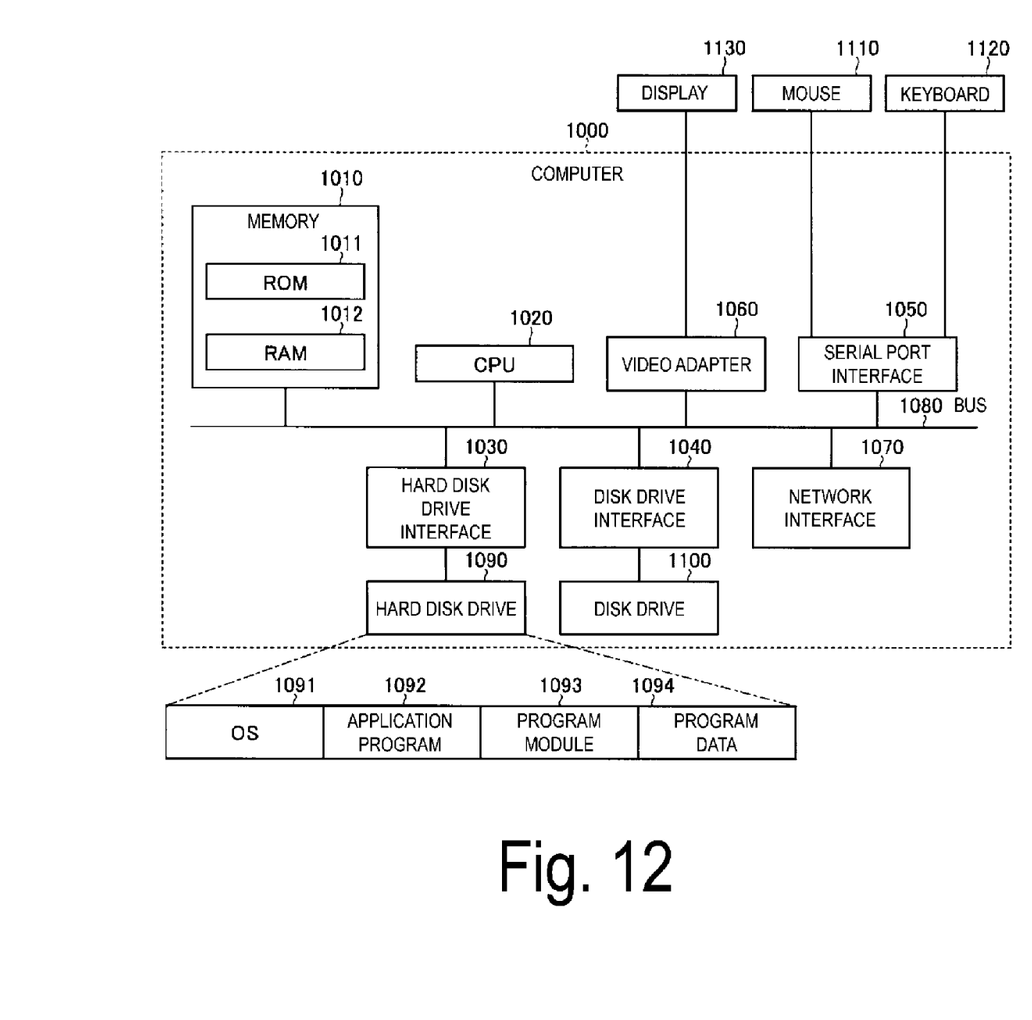
FIG. 12 is a diagram illustrating one example of a computer that executes a collation program.

FIG. 12 is a diagram illustrating one example of the computer that executes the collation program. A computer 1000 includes, for example, a memory 1010, a CPU 1020, a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a RAM 1012. The ROM 1011 stores, for example, a boot program such as a Basic Input Output System (BIOS). The hard disk drive interface 1030 is connected to the hard disk drive 1031. The disk drive interface 1040 is connected to a disk drive 1041. A detachable storage medium such as a magnetic disk or an optical disc, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. The respective pieces of information described in the aforementioned embodiments are stored in, for example, the hard disk drive 1031 and the memory 1010.

Further, the collation program, for example, is stored in the hard disk drive 1031 as the program module 1093 in which instructions to be executed by the computer 1000 are described. Specifically, the program module 1093 in which each processing executed by the collation apparatus 10 described in the aforementioned embodiment is described is stored in the hard disk drive 1031.

Data to be used in information processing according to the collation program is stored as the program data 1094, for example, in the hard disk drive 1031. Then, the CPU 1020 reads the program module 1093 and the program data 1094 stored in the hard disk drive 1031 as needed in the RAM 1012 and executes each of the aforementioned procedures.

The program module 1093 and the program data 1094 related to the collation program is not limited to being stored in the hard disk drive 1031. For example, the program module 1093 and the program data 1094 may be stored on a detachable storage medium and read by the CPU 1020 via the disk drive 1041 or the like. Alternatively, the program module 1093 and the program data 1094 related to the collation program may be stored in another computer connected via a network such as a Local Area Network (LAN) or a Wide Area Network (WAN) and read by the CPU 1020 via the network interface 1070.

Although the embodiments to which the disclosure made by the present inventors is applied have been described above, the present disclosure is not limited by the description and the drawings as a part of the present disclosure according to the embodiments. In other words, all of other embodiments, examples, operation technologies, and the like made by those skilled in the art based on the present embodiment are within the scope of the disclosure.

REFERENCE SIGNS LIST

10 Collation apparatus
11 Input unit
12 Output unit
13 Communication control unit
14 Storage unit
15 Control unit
15a Index generation unit
15b Batch generation unit
16 Collation unit

The invention claimed is:

1. A collation apparatus comprising a first processor configured to execute a method comprising:
   generating an index having a plurality of combinations, wherein each combination of the plurality of combinations comprises query data that is a collation source and target data that is a collation destination, the plurality of combinations are listed in a predetermined order;
   generating, based on the plurality of combinations, a batch with a predetermined volume, wherein the predetermined volume is based on a memory capacity of a second processor, wherein the batch includes a plurality of the query data, wherein the second processor performs a plurality of tasks to compare one or more query data of the plurality of the query data and corresponding target data in the plurality of combinations in parallel as a matrix operation;
   inputting the batch with the predetermined volume to a memory of the second processor to execute the matrix operation; and
   determining, using the second processor, a degree of similarity between the query data and the target data in the plurality of combinations included in the batch as a result of collation, wherein the second processor processes two or more combinations of the plurality of combinations in the batch in parallel as the matrix operation, and the determining further includes processing at least one of a first neural network for estimating first feature values of the query data and second feature values of the target data or a second neural network for estimating the degree of similarity based on the first feature values and the second feature values.

2. The collation apparatus according to claim 1, the first processor further configured to execute a method comprising:
   listing the plurality of combinations in order of a sequence of the target data.

3. The collation apparatus according to claim 2, the first processor further configured to execute a method comprising:
   calculating the degree of similarity by deep learning based on a neural network.

4. The collation apparatus according to claim 2, the first processor further configured to execute a method comprising:
   calculating the degree of similarity by using features of the query data and the target data.

5. The collation apparatus according to claim 1, the first processor further configured to execute a method comprising:
   calculating the degree of similarity by using a neural network.

6. The collation apparatus according to claim 5, the first processor further configured to execute a method comprising:
   calculating the degree of similarity by using features of the query data and the target data.

7. The collation apparatus according to claim 1, the first processor further configured to execute a method comprising:
   calculating the degree of similarity by using features of the query data and the target data.

8. A collation method comprising:
   generating an index having a plurality of combinations, wherein each combination of the plurality of combinations comprises query data that is a collation source and target data that is a collation destination, the plurality of combinations are listed in a predetermined order;
   generating, based on the plurality of combinations, a batch with a predetermined volume, wherein the predetermined volume is based on a memory capacity of a processor, wherein the batch includes a plurality of the query data, wherein the processor performs a plurality of tasks to compare one or more query data of the plurality of the query data and corresponding target data in the plurality of combinations in parallel as a matrix operation;
   inputting the batch with the predetermined volume to a memory of the processor to execute the matrix operation; and
   determining, using the processor, a degree of similarity between the query data and the target data in the plurality of combinations included in the batch as a result of collation, wherein the processor processes two or more combinations of the plurality of combinations in the batch in parallel as the matrix operation, and the determining further includes processing at least one of a first neural network for estimating first feature values of the query data and second feature values of the target data or a second neural network for estimating the degree of similarity based on the first feature values and the second feature values.

9. The collation method according to claim 8, further comprising:
   listing the plurality of combinations in order of a sequence of the target data.

10. The collation method according to claim 9, further comprising:
    calculating the degree of similarity by deep learning based on a neural network.

11. The collation method according to claim 9, further comprising:
    calculating the degree of similarity by using features of the query data and the target data.

12. The collation method according to claim 8, further comprising:
    calculating the degree of similarity by deep learning based on a neural network.

13. The collation method according to claim 12, further comprising:
    calculating the degree of similarity by using features of the query data and the target data.

14. The collation method according to claim 8, further comprising:
    calculating the degree of similarity by using features of the query data and the target data.

15. A system for collating, the system comprises:
a processor; and
a memory storing computer-executable program instructions that when executed by the processor causes the system to execute a method comprising:
generating an index having a plurality of combinations, wherein each combination of the plurality of combinations comprises query data that is a collation source and target data that is a collation destination, the plurality of combinations are listed in a predetermined order;
generating, based on the plurality of combinations, a batch with a predetermined volume, wherein the predetermined volume is based on a memory capacity of a second processor, wherein the batch includes a plurality of the query data, wherein the second processor performs a plurality of tasks to compare one or more query data of the plurality of the query data and corresponding target data in the plurality of combinations in parallel as a matrix operation;
inputting the batch with the predetermined volume to a memory of the second processor to execute the matrix operation; and
determining, using the second processor, a degree of similarity between the query data and the target data in the plurality of combinations included in the batch as a result of collation, wherein the second processor processes two or more combinations of the plurality of combinations in the batch in parallel as the matrix operation, and the determining further includes processing at least one of a first neural network for estimating first feature values of the query data and second feature values of the target data or a second neural network for estimating the degree of similarity based on the first feature values and the second feature values.

16. The system of claim 15, the computer-executable program instructions that when executed by the processor causes the system to execute a method comprising:
listing the plurality of combinations in order of a sequence of the target data.

17. The system of claim 16, the computer-executable program instructions that when executed by the processor causes the system to execute a method comprising:
calculating the degree of similarity by deep learning based on a neural network.

18. The system of claim 16, the computer-executable program instructions that when executed by the processor causes the system to execute a method comprising:
calculating the degree of similarity by using features of the query data and the target data.

19. The system of claim 15, the computer-executable program instructions that when executed by the processor causes the system to execute a method comprising:
calculating the degree of similarity by deep learning based on a neural network.

20. The system of claim 15, the computer-executable program instructions that when executed by the processor causes the system to execute a method comprising:
calculating the degree of similarity by using features of the query data and the target data.

* * * * *